(12) United States Patent
Sicard et al.

(10) Patent No.: US 9,650,895 B2
(45) Date of Patent: May 16, 2017

(54) TURBINE WHEEL IN A TURBINE ENGINE

(71) Applicant: SNECMA, Paris (FR)

(72) Inventors: Josselin Sicard, Savigny le Temple (FR); Helene Barret, Paris (FR); Stephane Pierre Guillaume Blanchard, Chartrettes (FR); Youki Olivier Ito-Lardeau, Paris (FR); Bertrand Pellaton, Verneuil l'Etang (FR)

(73) Assignee: SNECMA, Paris (FR)

( * ) Notice: Subject to any disclaimer, the term of this patent is extended or adjusted under 35 U.S.C. 154(b) by 321 days.

(21) Appl. No.: 14/288,761

(22) Filed: May 28, 2014

(65) Prior Publication Data

US 2014/0356172 A1 Dec. 4, 2014

(30) Foreign Application Priority Data

May 28, 2013 (FR) ...................... 13 54839

(51) Int. Cl.
*F01D 5/08* (2006.01)
*F01D 5/06* (2006.01)
*F01D 5/30* (2006.01)

(52) U.S. Cl.
CPC ............ *F01D 5/06* (2013.01); *F01D 5/081* (2013.01); *F01D 5/3007* (2013.01); *F01D 5/082* (2013.01); *F01D 5/087* (2013.01); *F05D 2240/81* (2013.01); *Y02T 50/676* (2013.01)

(58) Field of Classification Search
CPC .......... F01D 5/081; F01D 5/082; F01D 5/087; F01D 5/3015
See application file for complete search history.

(56) References Cited

U.S. PATENT DOCUMENTS 3,295,825 A * 1/1967 Hall, Jr. .................. F01D 5/06
                                                        415/173.7
3,834,831 A 9/1974 Mitchell
(Continued)

FOREIGN PATENT DOCUMENTS

EP       2 243 927 A2    10/2010
EP       2 436 879 A2    4/2012
(Continued)

OTHER PUBLICATIONS

French Preliminary Search Report issued Feb. 18, 2014 in French application 13 54839, filed on May 28, 2013 ( with English Translation of Categories of Cited Documents and Written Opinion).

*Primary Examiner* — John K Fristoe, Jr.
*Assistant Examiner* — John Hunter
(74) *Attorney, Agent, or Firm* — Oblon, McClelland, Maier & Neustadt, L.L.P.

(57) ABSTRACT

A turbine wheel including a plurality of blades having roots engaged axially and held radially in slots in a disk alternating between teeth of the disk, in which the blades have platforms arranged circumferentially end to end and each connected to a blade root by a tang, is provided. Separator walls extend from the tangs in a circumferential direction and from upstream to downstream so as to define radially between the platforms and the teeth of the disk at least a radially inner cavity and a radially outer cavity between two adjacent tangs.

11 Claims, 3 Drawing Sheets

(56) References Cited

U.S. PATENT DOCUMENTS

| | | | | |
|---|---|---|---|---|
| 4,872,812 A | * | 10/1989 | Hendley | F01D 5/22 |
| | | | | 416/190 |
| 5,415,526 A | | 5/1995 | Mercadante et al. | |
| 6,331,097 B1 | * | 12/2001 | Jendrix | F01D 5/081 |
| | | | | 416/219 R |
| 6,926,496 B2 | * | 8/2005 | Ackermann | F23M 5/00 |
| | | | | 415/191 |
| 7,207,776 B2 | * | 4/2007 | Townes | F01D 5/081 |
| | | | | 416/193 A |
| 2012/0082568 A1 | | 4/2012 | Tibbott et al. | |

FOREIGN PATENT DOCUMENTS

| | | |
|---|---|---|
| FR | 2 972 759 A1 | 9/2012 |
| WO | WO 2012/076588 A1 | 6/2012 |

* cited by examiner

TURBINE WHEEL IN A TURBINE ENGINE

BACKGROUND OF THE INVENTION

Field of the Invention

The present invention relates to turbine wheel blades in a turbine engine such as an airplane turboprop or turbojet.

Description of the Related Art

Conventionally, a turbine in a turbine engine comprises alternating annular rows of stationary vanes and of rotor wheels, each wheel having a plurality of radial blades mounted at the periphery of a rotor disk. Each blade has a root connected via a tang to a platform from which there extends an airfoil. The blade roots are engaged with little clearance in substantially axial slots in the periphery of the disk, which slots are regularly distributed around the axis of the disk and define splines or teeth between them. The blades are held radially in the slots by co-operating shapes, the blade roots having a cross-section of dovetail or analogous shape, for example. In the assembled position, the platforms of the blades are arranged circumferentially side by side and they surround the teeth of the disk.

It is known for the spaces that are situated radially inside the platforms and defined circumferentially between two consecutive tangs to be partitioned in the axial direction in order to limit the flow of hot air coming from the main flow passage and going towards the disk.

For this purpose, upstream and/or downstream radial walls may connect the upstream and/or downstream edges to the blade root. It is also possible to combine the above-mentioned radial walls with the use of annular plates mounted on the upstream and/or downstream faces of the disk carrying the rotor blades. With radial walls, the circumferential edges of the blade platforms and the circumferential edges of the radial walls of two adjacent blades are spaced apart circumferentially by the small amounts of clearance that are needed for assembling the blades on the disk. When a plate is mounted on an upstream or downstream face of the disk, it may for example be engaged at its radially inner periphery in an annular groove of the disk, and at its radially outer periphery in an annular groove formed radially inside the platforms that are arranged end to end. Axial clearance may also exist between the plates and the platforms of the blades.

In operation, it is found that the hot gas from the combustion chamber can flow into the cavities situated under the platforms through the clearance between the facing circumferential edges of the platforms, thereby leading to the disk being heated and possibly being damaged.

In order to reduce the heating of the teeth of the disk, it is known (from FR 2 972 759) to mount a sealing member in each inter-blade cavity, which sealing members are urged radially outwards in operation by centrifugal force and come to press radially against the inside faces of circumferentially facing platforms in order to limit leakage of hot gas therebetween. Such sealing members may also serve to damp the vibration to which the blades are subjected in operation.

Nevertheless, in operation, it is found that hot gas from the main passage can reach the insides of the cavities by passing around the zones where the above-mentioned sealing members press against the inside faces of the platforms. Furthermore, that type of part is subjected to a large amount of wear, thereby correspondingly reducing its effectiveness and its lifetime.

In order to reduce the temperature in the inter-blade cavities, cooling air is taken upstream in the turbine engine from a low or high pressure compressor and is conveyed via ducts from a zone where the disk is attached to another disk into the inter-blade cavities so as to limit the increase of temperature therein and limit the heating of the periphery of the disk.

When the rotor wheel constitutes the first wheel that the upstream end or the last wheel at the downstream end of the turbine rotor, an annular gap is formed between the upstream first wheel and a stator element upstream from the first wheel or between the downstream last wheel and a stator element downstream from the last wheel. This annular gap thus provides direct communication between the main passage for combustion gas flow and internal elements of the turbine engine.

In order to avoid hot air being introduced to the inside of the turbine engine, it is then necessary to prevent the hot gas from the main passage flowing through such an annular gap. For this purpose, a fraction of the cooling air taken from the compressor is directed radially outwards through the annular gap, thereby compensating the pressure of the hot air stream in the main passage and keeping the hot air in said passage. Nevertheless, that requires an additional amount of cooling air to be taken off in order to obtain a flow rate of the cooling air that is great enough to prevent hot air from flowing towards the inside of the turbine.

In general, the cooling air taken from the compressor reduces the efficiency of the compressor and consequently reduces the performance of the turbine engine.

BRIEF SUMMARY OF THE INVENTION

A particular object of the invention is to reduce the consumption of cooling air taken from the compressor while providing good cooling of the disk, and in particular of their outer peripheries.

To this end, the invention provides a turbine wheel comprising a plurality of blades having roots engaged axially and held radially in slots in a disk alternating between teeth of the disk, the blades having platforms arranged circumferentially end to end with clearance and each connected to a blade root by a tang, the wheel being characterized in that each blade comprises at least two separator walls extending from the tangs in a circumferential direction and from upstream to downstream, the separator walls being arranged end to end with clearance so as to define radially between the platform and the teeth of the disk at least a radially inner cavity and a radially outer cavity between two consecutive tangs, for each pair of blades, the circumferential clearance between two ends of platforms is substantially similar to the circumferential clearance between the two circumferential ends of the two separator walls located radially inside with respect to the said two platforms.

These separator walls on the tangs of the blades define at least an inner cavity and an outer cavity between two tangs for limiting the flow of hot gas passing between two facing platform ends and reaching the teeth of the disk.

In operation, cooling air is brought from the inside of the turbine to the blade roots, this air being taken for example from a low or high pressure compressor. The separator walls resist the flow of the cooling air stream from the inner cavity into the outer cavity. As a result the above-mentioned inner cavities have a larger proportion of cooling air than the outer cavities, thus making it possible to reduce the temperature of the air in the proximity of the disk under cooling air feed conditions that are identical to those of the prior art. It is thus possible to reduce the flow rate of cooling air that is needed.

Finally, when the wheel forms the first wheel or the last wheel at the upstream or downstream end of the turbine in a configuration similar to that described with reference to the prior art, it results that the pressure of the cooling stream in the outer portion of the annular gap relative to the cavities is greater than in the prior art for equivalent cooling air feed conditions, thereby providing the inner elements of the wheel with greater protection against the hot stream in the main passage when the wheel is located at the upstream end or at the downstream end of a turbine.

The invention thus makes it possible to reduce the flow rate of cooling air, while keeping the disk and the inner elements of the wheel at a good operating temperature. The cooling air that is thus not taken from the compressor can then contribute to improving the performance of the turbine engine.

It is thus possible to define the circumferential dimensions of the separator walls on the basis of the dimensions of the platforms, which have already been studied and defined so as to present the smallest possible assembly clearances between one another. Then, the circumferential assembly clearance between two consecutive platforms may be substantially the same as the circumferential clearance between two ends of separator walls that extend circumferentially facing each other.

Said walls may be formed substantially halfway between the blade roots and the platforms.

According to another characteristic of the invention, said walls extend substantially perpendicularly to the radial tangs of the blades.

The upstream and/or downstream edges of the platforms are extended towards the blade root by substantially radial walls having circumferential edges arranged circumferentially end to end.

In a preferred embodiment of the invention, the separator walls are connected to the tang and to the radial walls, thereby providing good mechanical connection between the separator walls and the blade as a whole.

In another possible embodiment, at least one annular plate is mounted at one of the upstream or downstream ends of the disk so as to shut off the radial space between the platforms and the teeth of the disk angularly.

The invention also provides a low pressure turbine for a turbine engine, the turbine having at least one turbine wheel of the above-described type together with means for bringing cooling air from the inside of the turbine and leading into the inner cavities between two adjacent blades.

In a particular embodiment of the invention, said turbine wheel forms the first wheel at the upstream end or the last wheel at the downstream end of the low pressure turbine, and an annular gap is arranged between said wheel and a substantially circumferential stator wall upstream or downstream therefrom respectively, in alignment with the platforms of the blades of the wheel to allow cooling air to flow from the inside of the turbine into said annular space.

The invention also provides a turbine engine such as a turboprop or a turbojet and including a turbine wheel as described above.

BRIEF DESCRIPTION OF THE SEVERAL VIEWS OF THE DRAWINGS

The invention can be better understood and other details, characteristics, and advantages of the present invention appear more clearly on reading the following description made by way of non-limiting example and with reference to the accompanying drawings, in which.

DETAILED DESCRIPTION OF THE INVENTION

Figure 1:
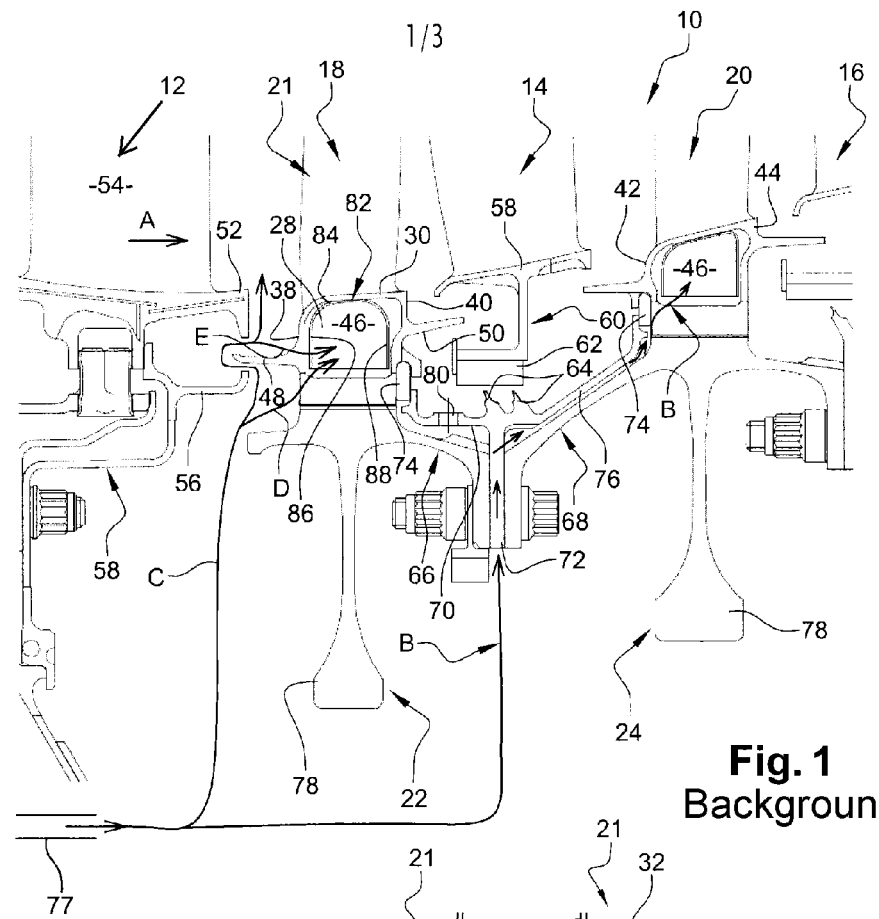
FIG. 1 is a fragmentary diagrammatic half-view in axial section of the upstream portion of a low pressure turbine of a turbine engine.
Figure 2:
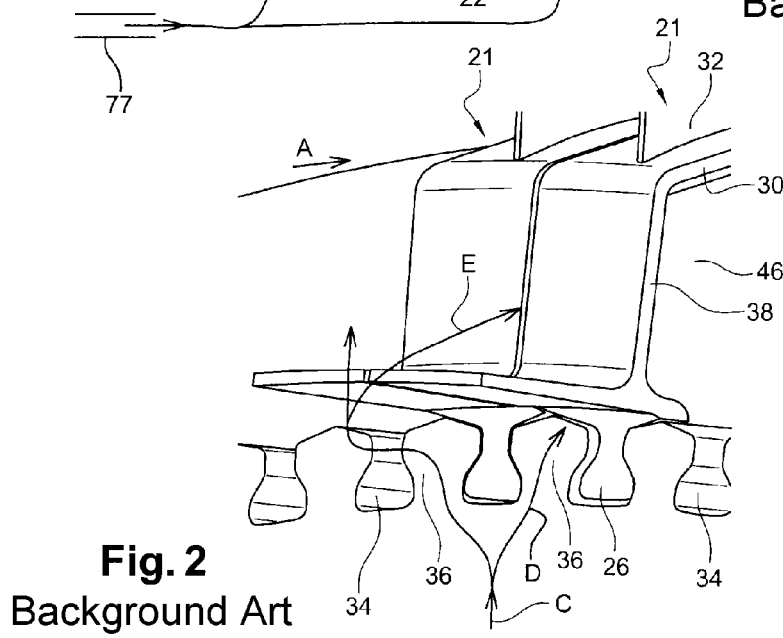
FIG. 2 is a fragmentary diagrammatic view in perspective from upstream of two adjacent blades of the first upstream wheel of the FIG. 1 turbine.

Reference is made initially to FIG. 1 which shows a low pressure turbine 10 of the prior art arranged downstream from a high pressure turbine 12. The low pressure turbine 10 comprises alternating rows of stationary annular vanes 14, 16 and rotor wheels 18, 20. Each rotor wheel 18, 20 comprises a plurality of blades 21 mounted at the periphery of a disk 22, 24. Each blade has a root 26 connected by a tang 28 to the middle portion of a platform 30 from which there extends an airfoil 32 (FIG. 2). Each platform 30 extends on either side of the airfoil 32. The blade roots 26 are engaged in substantially axial slots 34 in the periphery of the disk 22, 24, which slots are regularly distributed around the axis of the disk 22, 24 and define between them splines or teeth 36. The roots 26 are held radially in the slots 34 of the disk by co-operating shapes, the blade roots 26 being of dovetail or analogous shape in cross-section, for example. Each platform 30 is extended at its upstream and downstream ends by radial walls 38, 40, 42, 44 that are connected at their radially inner ends to the blade root 26.

Between two adjacent blades 21, a cavity 46 is defined circumferentially between two circumferentially facing tangs 28, radially by a tooth 36 of the disk and two adjacent circumferentially facing platforms 30, and axially by the circumferentially facing upstream and downstream radial walls 38 and 40 of the two adjacent blades 21.

The upstream radial wall 38 of the platform 30 is connected to a lip 48 extending upstream and the downstream radial wall 40 is connected to a downstream lip 50 extending downstream. The upstream ends of the upstream lips 48 are radially engaged between the downstream ends of the platforms 52 of a row of stator vanes 54 of the high pressure turbine 12 and the downstream end of a cylindrical wall 56 of an annular plate 58 fastened by bolts onto a stator portion of the high pressure turbine. Likewise, the downstream ends of the downstream lips 50 are engaged radially between the upstream ends of the inner platforms 58 of the row of downstream stator vanes 14 and the upstream end of an L-section support 60 carrying a block of abradable material 62 co-operating with wipers 64 to form a labyrinth seal.

In operation, the upstream and downstream lips 48 and 50 co-operate with stationary portions of the upstream and downstream stator vane rows to form baffles radially limiting the flow of hot gas (arrow A) towards the inside of the turbine.

The rotor wheels 18, 20 of the low pressure turbine are fastened to one another by bolting together annular flanges 66, 68 extending axially towards each other from each disk 22, 24. The wipers 64 are formed on a substantially cylindrical wall 70 formed at the radially outer end of a radial annular wall 72 interposed between the two annular flanges 66, 68 and fastened by means of the fastener bolts of the annular flanges 66, 68. The cylindrical wall 70 is in annular contact at its upstream end with an annular gasket 74 applied against the downstream face of the disk 22 of the first turbine wheel 18, and the downstream end of the cylindrical wall 70 is extended by a frustoconical wall 76 of section that increases going downstream with its downstream end in annular contact with an annular gasket 74 applied against the upstream face of the disk 24 that is immediately downstream.

In operation, the hot gas flowing radially outside the platforms can pass into the inter-blade cavities through the clearance that exists between the facing circumferential edges 30 of the platforms. The hot air from the main flow passage can also flow between the circumferentially facing edges of the upstream radial walls 38, 42 of the blades.

This hot air that penetrates into the inter-blade cavities 46 leads to an increase in the temperature of the disks 22, 24 that can damage them and reduce their lifetime.

It is known to take cold air from a low pressure compressor arranged at the upstream end of the turbine engine, this cold air flowing inside the engine by means of a suitable duct 77 delivering radially to the insides of the disks 22, 24 of the low pressure turbine at the level of balance weights 78. This cold air (arrow B) then flows along ducts (not shown) formed in the thickness of the radial wall 72 carrying the wipers 64 or the annular flanges and then through orifices 80 in the cylindrical wall 70 for limiting ingress of hot gas. Cold air also flows between the annular flange 68 and the frustoconical wall 76 to the blade roots of the disk 24 and in the inter-blade cavities 46 of the disk.

As shown in FIG. 1, the first wheel 18 of the low pressure turbine rotor is not connected to any upstream element such that hot air (arrow A) from the main passage can flow to the balance weights 78 of the disks 22, 24 of the turbine between the downstream ends of the platforms 52 in the row of stator vanes 54 and the upstream ends of the platforms 30 of the first rotor wheel.

In order to prevent this flow of hot air, the flow rate at which air is taken from the compressor must be of sufficient magnitude to prevent any hot air penetrating between the upstream platforms 52 and the platforms 30 of the first wheel 18.

Thus, in operation, as the cold air (arrow C) flowing upstream from the first turbine wheel 22 travels radially outwards towards the main hot air passage, a first fraction of the cold air flow (arrow D) flows under the upstream lips of the first wheel in the slots of the disk and then in the inter-blade cavities 46, while a second fraction (arrow E) flows round the upstream lip and between the upstream radial walls 38 of the platforms 30, and a third fraction flows towards the main hot air passage.

Thus, the cooling air fed to the inter-blade cavities 46 enables the temperature of the disks 22, 24 to be reduced.

In order to limit flows of hot air in the inter-blade cavities 46 between two adjacent blades 21, it is known to place a sealing member 82 in each inter-blade cavity. Such a member is of U-shaped section having a first branch 84 extending circumferentially and axially inside two circumferentially facing platforms 30 from one tang towards an adjacent tang, and two second branches 86 and 88 located laterally upstream and downstream that extend circumferentially and radially between two adjacent tangs 28. In operation, each sealing member 82 is urged radially outwards by centrifugal force so that the first branch 84 presses radially outwards against the inside surfaces of two circumferentially facing platforms 30 in order to limit any passage of hot gas between the circumferential edges of the platforms. The second branches 84, 86 serve to limit flows of hot air through the gaps between two consecutive radial walls.

As mentioned above, when the first branches 84 of the sealing members 82 press against the platforms 30 they do not provide surface-on-surface contact but rather points of contact, thereby allowing hot air to penetrate into the cavities around the contact points and thus heat the turbine disk 22, 24.

Figure 3:
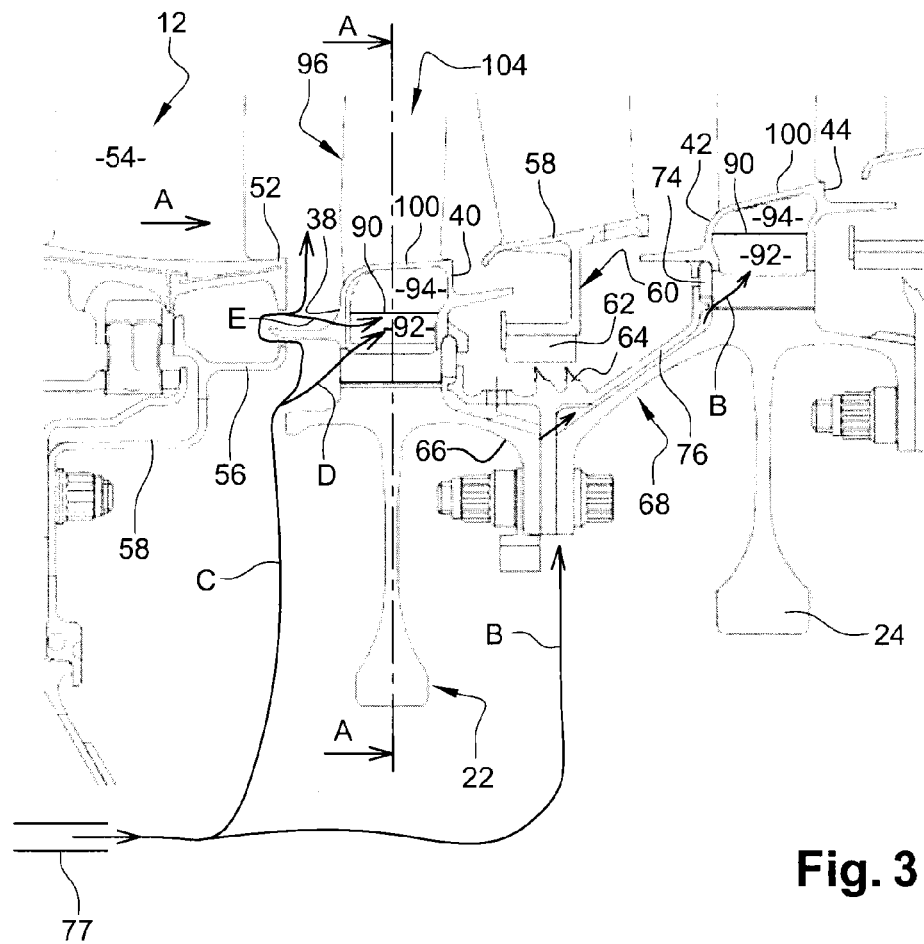
FIG. 3 is a fragmentary diagrammatic half-view in axial section of the upstream portion of a turbine including a wheel of the invention.
Figure 4:
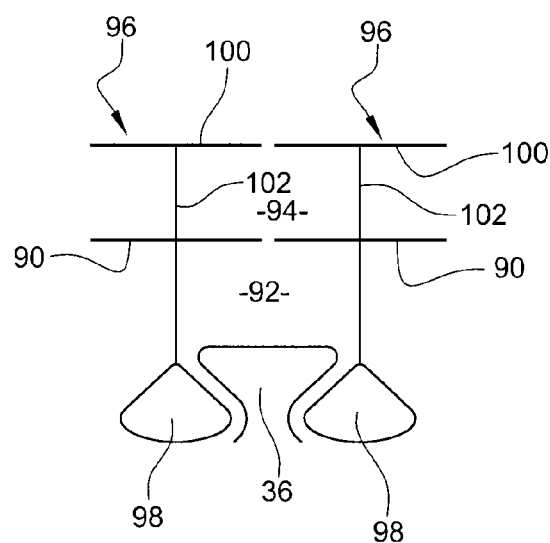
FIG. 4 is a diagrammatic representation on section plane AA of FIG. 3.

In order to remedy those drawbacks, the invention proposes adding separator walls 90 in the inter-blade cavities 46, such a separator wall extending circumferentially from a tang from upstream to downstream on either side of the tang so as to split the above-described cavity between two adjacent blade tangs radially into a radially inner cavity 92 and a radially outer cavity 94 on either side of said separator walls 90 (FIGS. 3 and 4).

By way of example, the separator walls of each blade 96 are formed substantially halfway between the blade root 98 and the platform 100 and they extend substantially perpendicularly to the tang 102 that is itself formed by a wall that is substantially radial. As shown in FIG. 4, the clearance separating two circumferential walls is the same as the one separating the ends of the two platforms.

The inner and outer inter-blade cavities 92 and 94 that are formed in this way communicate with each other solely via the assembly clearance formed between the two circumferentially facing separator walls 90, which implies resistance to passing cooling air from the inner cavity 92 towards the outer cavity 94.

In operation, a fraction of the cooling air (arrows B and C, FIG. 3) coming from the inside of the turbine flows as far as the inner cavities 92. A fraction of the hot gas in the main passage flows into the outer cavities 94. The inner cavities 92 contain more cooling air than the outer cavities 94, thus enabling the temperature in the proximity of the disks 22, 24 to be reduced for cooling air feed conditions that are identical to the prior art.

Furthermore, the separator walls 90 provide greater resistance than in the prior art to passing the stream of air through the inner and outer cavities 92 and 94. Thus, for the turbine wheel 104 arranged at the upstream end of the low pressure turbine, the flow rate of cooling air flowing towards the main passage outside the cavities is greater than in the prior art for equivalent cooling air feed conditions, thereby providing greater protection to the inner elements of the wheel against the hot stream from the main passage.

The invention makes it possible to reduce the flow rate of cooling air, while keeping the disks 22, 24 and the internal elements of the wheels at good operating temperatures. The saving in cooling air contributes to improving the performance of the turbine engine.

Figure 5:
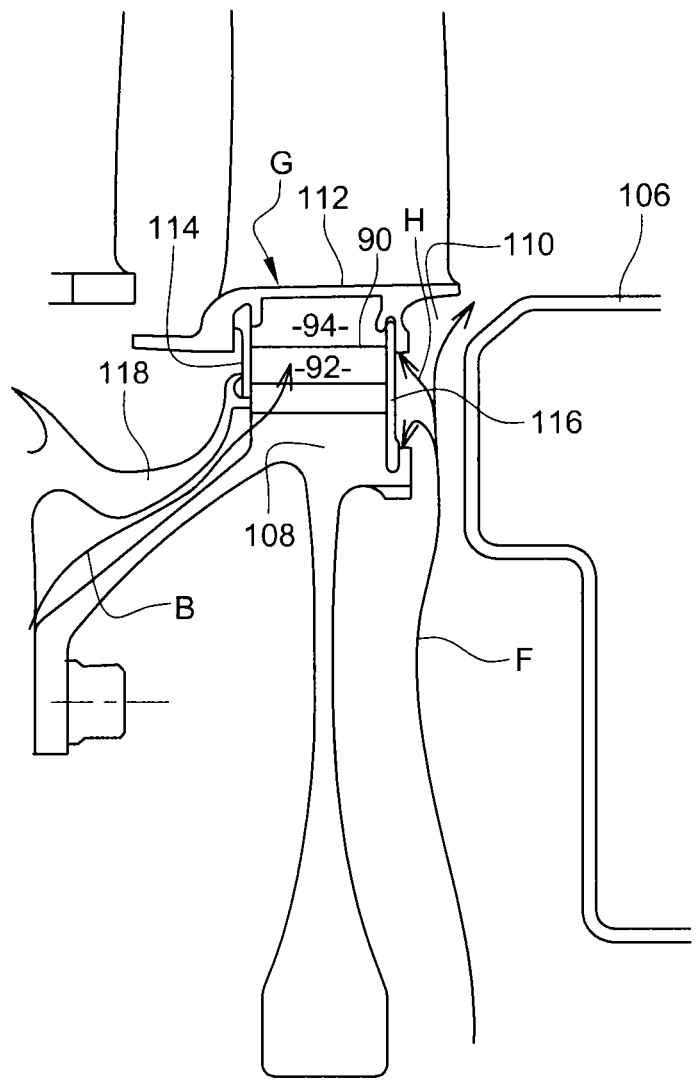
FIG. 5 is a fragmentary diagrammatic view in axial section of the last downstream turbine wheel of a low pressure turbine of the invention.

The invention is also applicable to a turbine wheel arranged at the downstream end of the low pressure turbine and immediately upstream from an exhaust casing 106 of the engine, as shown in FIG. 5. This last downstream disk 108 of the turbine is axially spaced apart from the exhaust casing 106 so as to form an annular gap 110 through which cooling air can flow (arrow F) from the inside of the turbine.

As shown in this FIG. 5, the platforms 112 are not connected to radial walls, as described above. In this embodiment, upstream and downstream annular plates 114 and 116 mounted on the upstream and downstream faces of the disk 108 serve to shut off the inner and outer inter-blade cavities 92 and 94 axially. The upstream plate 114 is held against the upstream face of the disk 108 in grooves in the inner walls of the platforms 112 and by the downstream end of a wiper support 118. The downstream plate 116 is held against the downstream face of the disk 108 in grooves in the inner walls of the platforms 112 and in a groove in the disk.

Hot gas flows in the outer inter-blade cavities 94 (arrow G) via assembly clearance between the facing circumferential edges of the platforms 112. The cooling air flows in the inter-blade cavities from upstream (arrow B) as described above, and from downstream (arrow H) through assembly clearance formed between the grooves and the downstream plate 116.

By adding separator walls 90, the stream of cooling air serves to keep the inner cavities 92 at a temperature lower than that of the outer cavities 94. In addition, the head loss of cooling air through these cavities is increased because of the incorporated cooling walls, thereby increasing the flow rate of air available outside the cavities for preventing hot gas being reintroduced into the turbine.

In practice, it is thus possible to reduce the total flow rate of cooling air taken from the compressor, thereby increasing the performance of the turbine.

The invention claimed is:

1. A turbine wheel, comprising:
a plurality of blades having roots engaged axially and held radially in slots in a disk alternating between teeth of the disk, the blades having platforms arranged circumferentially end to end with a circumferential clearance therebetween and each platform being connected to a blade root by a tang, the blade root presenting a dovetail shape in cross-section, the disk including an arm extending downstream and including an annular radial attachment flange at an end thereof, the radial attachment flange including a bolt hole,
wherein each platform is extended at an upstream end by an upstream radial wall connected at a radially inner end thereof to the blade root and is extended at a downstream end by a downstream radial wall connected at a radially inner end thereof to the blade root, an upstream lip extending upstream from the upstream radial wall and a downstream lip extending downstream from the downstream radial wall,
wherein a cavity is defined between two circumferentially adjacent blades, the cavity being circumferentially delimited by two adjacent tangs of the two circumferentially adjacent blades, radially delimited by one of the teeth of the disk and two adjacent platforms of the two circumferentially adjacent blades, and axially delimited by the upstream and downstream radial walls of the two circumferentially adjacent blades,
wherein each blade comprises two separator walls extending from the tang in a circumferential direction and from upstream to downstream, the separator walls being arranged end to end circumferentially with a circumferential clearance so as to divide the cavity into a radially inner cavity and a radially outer cavity between two consecutive tangs, for each pair of blades, the circumferential clearance between two ends of platforms is substantially similar to the circumferential clearance between the two circumferential ends of the two separator walls located radially inside with respect to the said two platforms.

2. A turbine wheel according to claim 1, wherein said separator walls are formed substantially halfway radially between the blade roots and the platforms.

3. A turbine wheel according to claim 1, wherein said separator walls extend substantially perpendicularly to the radial tangs of the blades.

4. A turbine wheel according to claim 1, wherein the separator walls are connected to the tang and to the upstream and downstream radial walls.

5. A low pressure turbine engine turbine, comprising:
a turbine wheel according to claim 1; and
means for bringing cooling air from the inside of the turbine and leading into the radially inner cavity between two adjacent blades.

6. A turbine according to claim 5, wherein said turbine wheel forms a first wheel at an upstream end of the low pressure turbine, and wherein an annular gap is arranged between said wheel and a substantially circumferential stator wall upstream therefrom, in substantially axial alignment with the platforms of the blades of the wheel to allow cooling air to flow from the inside of the turbine into said annular gap.

7. A turbine engine comprising:
a turbine according to claim 5.

8. A turbine wheel, comprising:
a plurality of blades having roots engaged axially and held radially in slots in a disk alternating between teeth of the disk, the blades having platforms arranged circumferentially end to end with a circumferential clearance and each platform being connected to a blade root by a tang, the blade root presenting a dovetail shape in cross-section, the disk including only one arm extending upstream and including an annular radial attachment flange at an end thereof, the radial attachment flange including a bolt hole,
wherein an upstream annular plate is mounted on an upstream face of the disk and a downstream annular plate is mounted on a downstream face of the disk, the upstream annular plate being held in an upstream groove provided in the platform and the downstream annular plate being held in a downstream groove provided in the platform,
wherein a cavity is defined between two circumferentially adjacent blades, the cavity being circumferentially delimited by two adjacent tangs of the two circumferentially adjacent blades, radially delimited by one of the teeth of the disk and two adjacent platforms of the two circumferentially adjacent blades, and axially delimited by the upstream and downstream annular plates, and
wherein each blade comprises two separator walls extending from the tangs in a circumferential direction and from upstream to downstream, the separator walls being arranged end to end circumferentially with a circumferential clearance so as to divide the cavity into a radially inner cavity and a radially outer cavity between two consecutive tangs, for each pair of blades, the circumferential clearance between two ends of platforms is substantially similar to the circumferential clearance between the two circumferential ends of the two separator walls located radially inside with respect to the said two platforms.

9. A low pressure turbine engine turbine, comprising:
a turbine wheel according to claim 8; and
means for bringing cooling air from the inside of the turbine and leading into the radially inner cavity between two adjacent blades.

10. A turbine according to claim 9, wherein said turbine wheel forms a last wheel at a downstream end of the low pressure turbine, and wherein an annular gap is arranged between said wheel and a substantially circumferential stator wall downstream therefrom, in substantially axial alignment with the platforms of the blades of the wheel to allow cooling air to flow from the inside of the turbine into said annular gap.

11. A turbine engine, comprising:
a turbine according to claim 10.

\* \* \* \* \*